US011793372B2

(12) United States Patent
Fie, II et al.

(10) Patent No.: US 11,793,372 B2
(45) Date of Patent: Oct. 24, 2023

(54) BLOWER WITH IMPROVED BATTERY COOLING

(71) Applicant: Husqvarna AB, Huskvarna (SE)

(72) Inventors: E. Arnold Fie, II, Denver, NC (US); Robert W. Schriever, Concord, NC (US)

(73) Assignee: HUSQVARNA AB, Huskvarna (SE)

( * ) Notice: Subject to any disclaimer, the term of this patent is extended or adjusted under 35 U.S.C. 154(b) by 807 days.

(21) Appl. No.: 16/611,028

(22) PCT Filed: Jun. 6, 2018

(86) PCT No.: PCT/IB2018/054063
§ 371 (c)(1),
(2) Date: Nov. 5, 2019

(87) PCT Pub. No.: WO2018/224985
PCT Pub. Date: Dec. 13, 2018

(65) Prior Publication Data
US 2020/0154962 A1    May 21, 2020

Related U.S. Application Data

(60) Provisional application No. 62/517,468, filed on Jun. 9, 2017.

(51) Int. Cl.
*A47L 5/14* (2006.01)
*H01M 10/613* (2014.01)
(Continued)

(52) U.S. Cl.
CPC ............... *A47L 5/14* (2013.01); *A01G 20/47* (2018.02); *A47L 9/2884* (2013.01);
(Continued)

(58) Field of Classification Search
CPC . A47L 5/14; A47L 9/2884; A47L 9/22; A01G 20/47; H01M 10/613;
(Continued)

(56) References Cited

U.S. PATENT DOCUMENTS

| 6,783,886 B1 | 8/2004 | Sakakibara et al. |
| 2014/0230181 A1 | 8/2014 | Tamaoka et al. |
| 2015/0211535 A1* | 7/2015 | Kodato ............... F04D 29/5806 417/371 |

FOREIGN PATENT DOCUMENTS

| CN | 104074155 A | 10/2014 |
| CN | 104074156 A | 10/2014 |

(Continued)

OTHER PUBLICATIONS

International Search Report and Written Opinion for International Application No. PCT/IB2018/054063 dated Sep. 3, 2018.

*Primary Examiner* — David Redding
(74) *Attorney, Agent, or Firm* — BURR & FORMAN LLP

(57) ABSTRACT

A blower may include a housing having a handle, an electric motor powered by a battery pack, and a fan assembly operably coupled to the electric motor to force air through a blower tube responsive to operation of the electric motor. The blower tube defines a blower tube axis. The fan assembly creates a low pressure area in a intake chamber that provides the air to the fan assembly. The air enters the intake chamber via at least one radial entrance and an axial entrance disposed in the housing. The axial entrance is configured to receive cooling air that has passed through the battery pack.

13 Claims, 11 Drawing Sheets

(51) Int. Cl.
    *H01M 10/6235* (2014.01)
    *H01M 10/6563* (2014.01)
    *A47L 9/28* (2006.01)
    *A01G 20/47* (2018.01)
    *F04D 19/00* (2006.01)
    *F04D 25/06* (2006.01)
    *F04D 29/58* (2006.01)
    *H01M 10/643* (2014.01)
    *H01M 50/213* (2021.01)
    *A47L 9/22* (2006.01)

(52) U.S. Cl.
    CPC ..... *H01M 10/613* (2015.04); *H01M 10/6235* (2015.04); *H01M 10/643* (2015.04); *H01M 10/6563* (2015.04); *H01M 50/213* (2021.01); *A47L 9/22* (2013.01); *F04D 19/002* (2013.01); *F04D 25/0673* (2013.01); *F04D 29/58* (2013.01)

(58) Field of Classification Search
    CPC ........... H01M 10/6235; H01M 10/643; H01M 10/6563; H01M 50/213; H01M 10/6566; H01M 2220/30; F04D 19/002; F04D 25/0673; F04D 29/58; Y02E 60/10; E01H 1/0809
    See application file for complete search history.

(56) References Cited

FOREIGN PATENT DOCUMENTS

| | | |
|---|---|---|
| CN | 104074157 A | 10/2014 |
| CN | 104582554 A | 4/2015 |
| CN | 106133329 A | 11/2016 |
| DE | 100 55 620 A1 | 12/2001 |
| DE | 20 2014 100752 U1 | 6/2014 |
| WO | 2014/030755 A1 | 2/2014 |
| WO | 2014/119175 A1 | 8/2014 |
| WO | 2015/161884 A1 | 10/2015 |

\* cited by examiner

BLOWER WITH IMPROVED BATTERY COOLING

CROSS REFERENCE TO RELATED APPLICATION

This application claims priority to U.S. application No. 62/517,468 filed Jun. 9, 2017, the entire contents of which are hereby incorporated by reference in its entirety.

TECHNICAL FIELD

Example embodiments generally relate to outdoor power equipment and, more particularly, relate to a structure for improving battery cooling for power equipment such as a blower.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors that could employ battery or mains power supplies. However, battery powered equipment provides even further advantages from a mobility perspective due to the fact that they remain untethered from any cords or other wired power supply.

Although battery powered outdoor power equipment has become more and more common, there continues to be a desire to improve the power and performance of such equipment. This desire can result in a drive toward increasing the capabilities of battery packs to store electrical energy and then deliver power to the electric motors of the equipment. However, the discharging of battery cells during operation of the equipment generates heat within the battery pack that houses the battery cells. Thus, any improvement in the power and performance of equipment must typically also include a corresponding improvement in the capacity for removing heat from the battery pack.

BRIEF SUMMARY OF SOME EXAMPLES

Some example embodiments may therefore provide structures that facilitate an improved capability for reduction of heat within the battery pack of outdoor power equipment. In particular, some example embodiments may provide structures for providing battery pack cooling by drawing the air that is ultimately to be expelled by the outdoor power equipment through the battery pack when the air is drawn into the equipment. Accordingly, some embodiments may provide improvements without the addition of extra components (e.g., cooling fans) or structures that may increase the size, cost and/or complexity of outdoor power equipment.

In accordance with an example embodiment, a blower may be provided. The blower may include a housing having a handle, an electric motor powered by a battery pack, and a fan assembly operably coupled to the electric motor to force air through a blower tube responsive to operation of the electric motor. The blower tube defines a blower tube axis. The fan assembly creates an area of low pressure in an intake chamber that provides the air to the fan assembly. The air enters the intake chamber via at least one radial entrance and an axial entrance disposed in the housing. The axial entrance is configured to receive cooling air that has passed through the battery pack.

In another example embodiment, a battery pack for powering an electric motor of a blower is provided. The electric motor may power a fan assembly operably coupled to the electric motor to force air through a blower tube responsive to operation of the electric motor. The battery pack may include a casing and battery cells cooled by cooling air drawn through the casing and configured to be expelled into an intake chamber that provides the air to the fan assembly. The casing is configured to mate with the housing such that at least a portion of the air comprises the cooling air and enters the intake chamber via an axial entrance disposed in the housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6A:
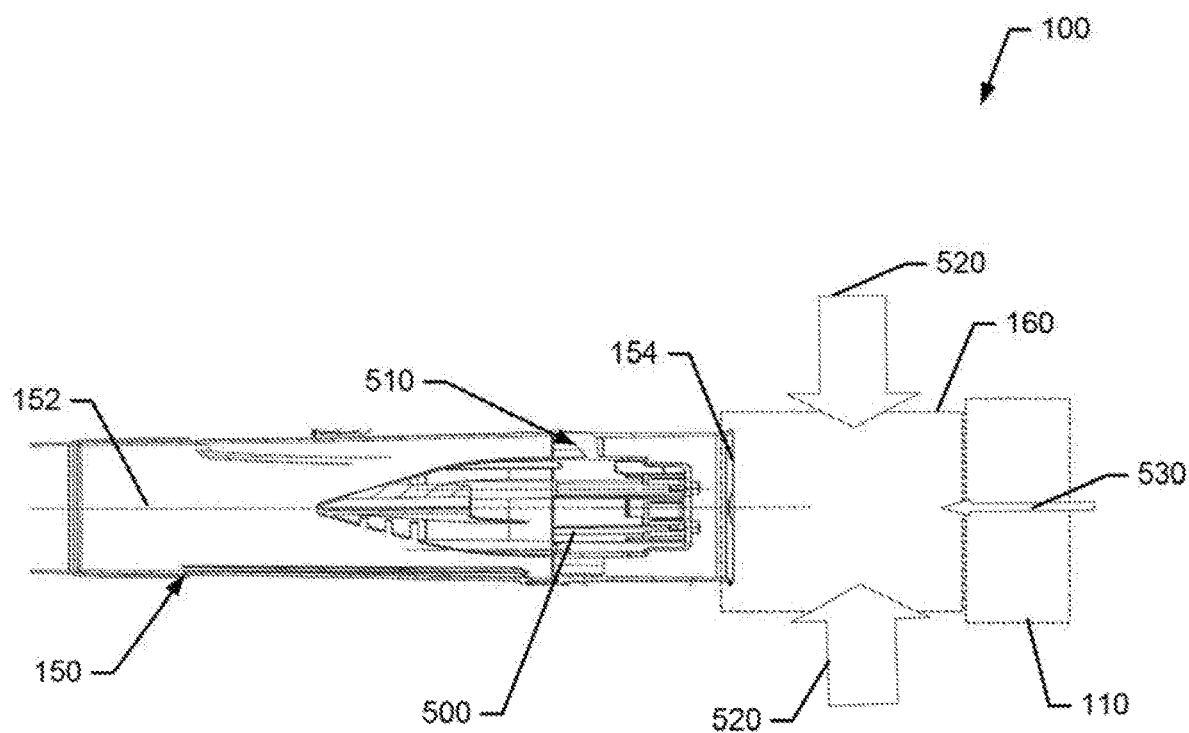
Figure 6B:
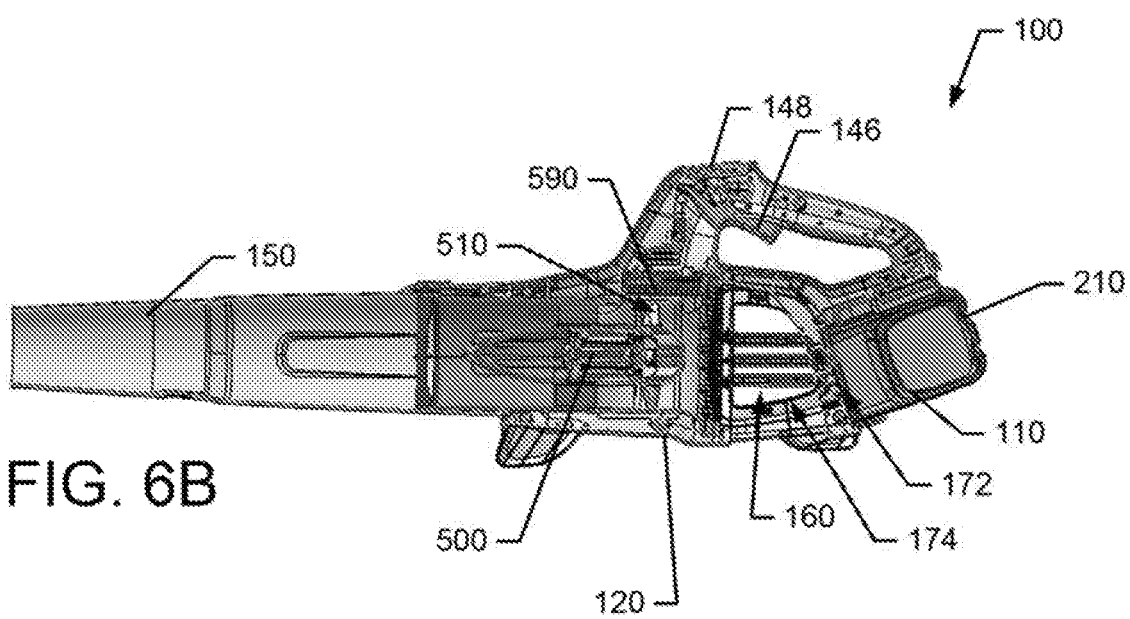
Figure 6C:
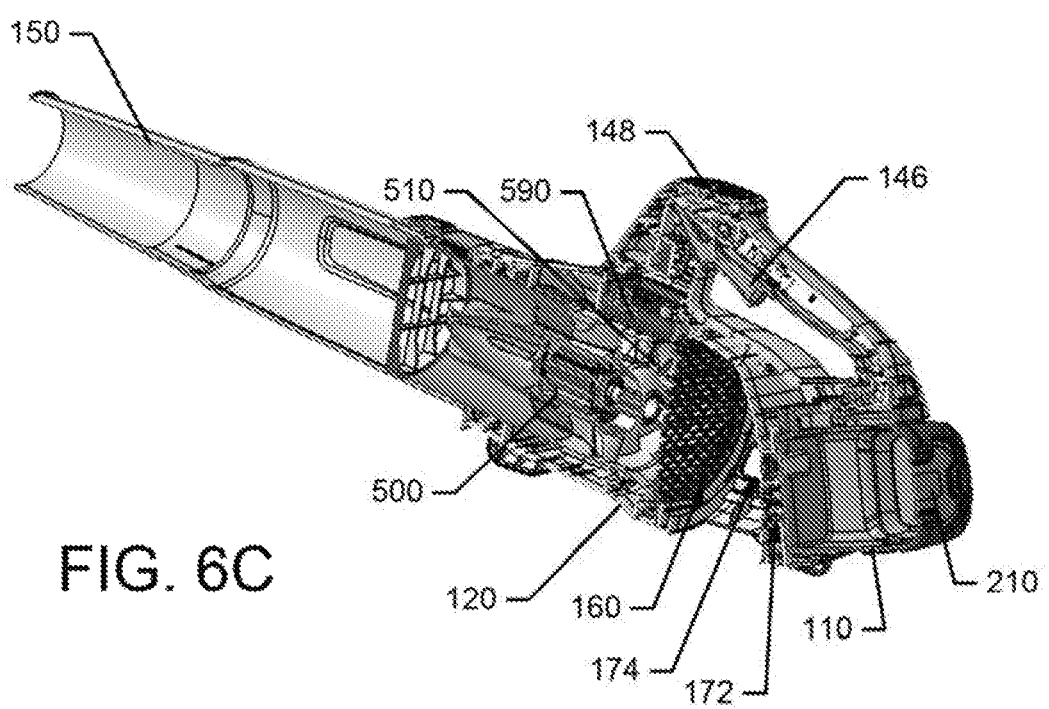
Figures 7A, 7B:
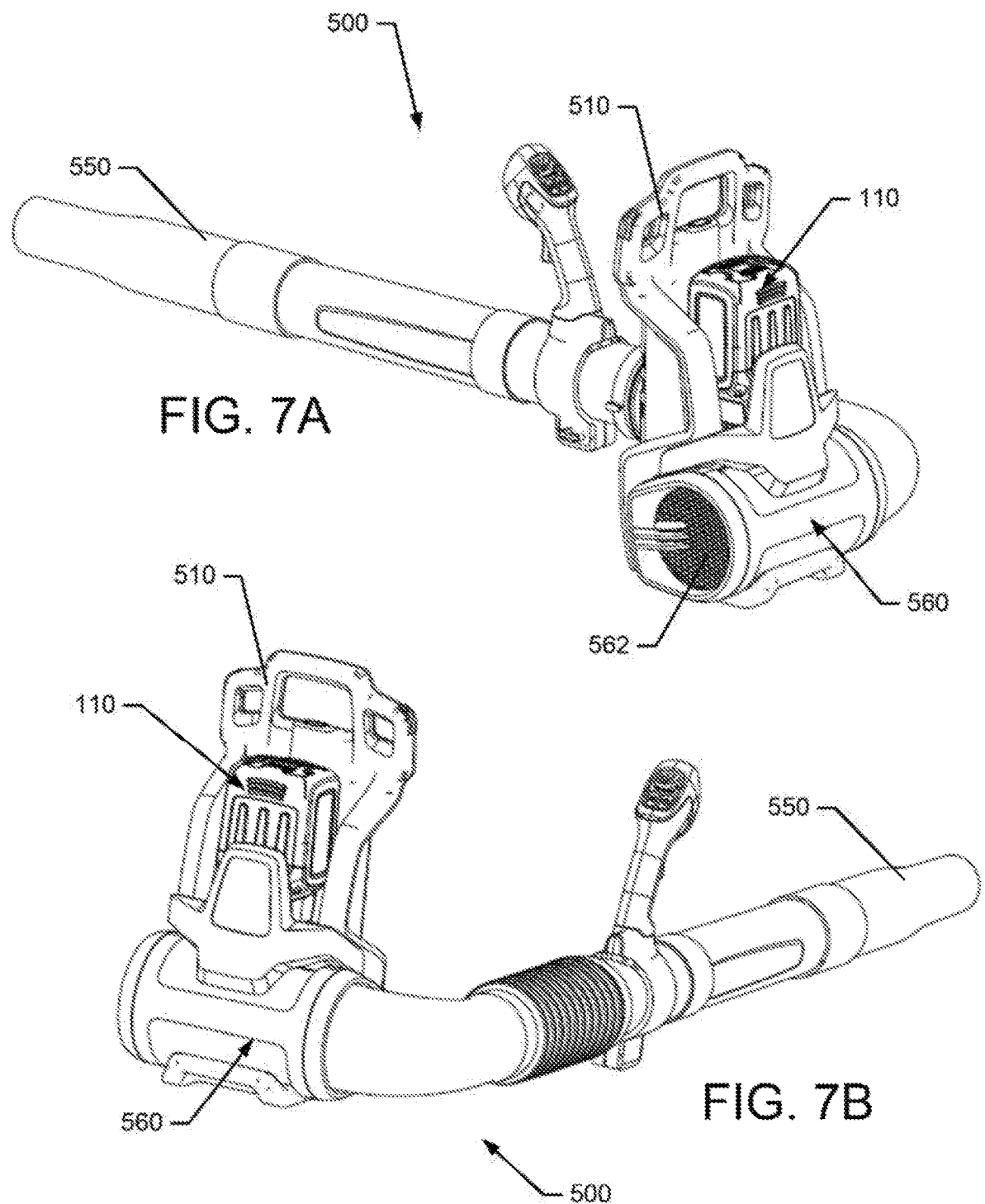

FIG. 6, which is defined by FIGS. 6A, 6B and 6C, illustrates various cross sectional views of the blower in accordance with an example embodiment;

FIG. 7A illustrates a left rear perspective view of the battery pack being used in a backpack blower according to an example embodiment; and FIG. 7B illustrates a right rear perspective view of the battery pack being used in the backpack blower according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for providing air to the blower in a manner that cools battery cells used to power the blower without any need for additional components (e.g., fans or other cooling apparatuses). Thus, rather than having to interrupt operation of the blower to allow the battery to cool down during a discharge operation, the blower can be continuously used until the battery is discharged since the battery cells will be effectively cooled during the operation of the blower.

Figure 1A:
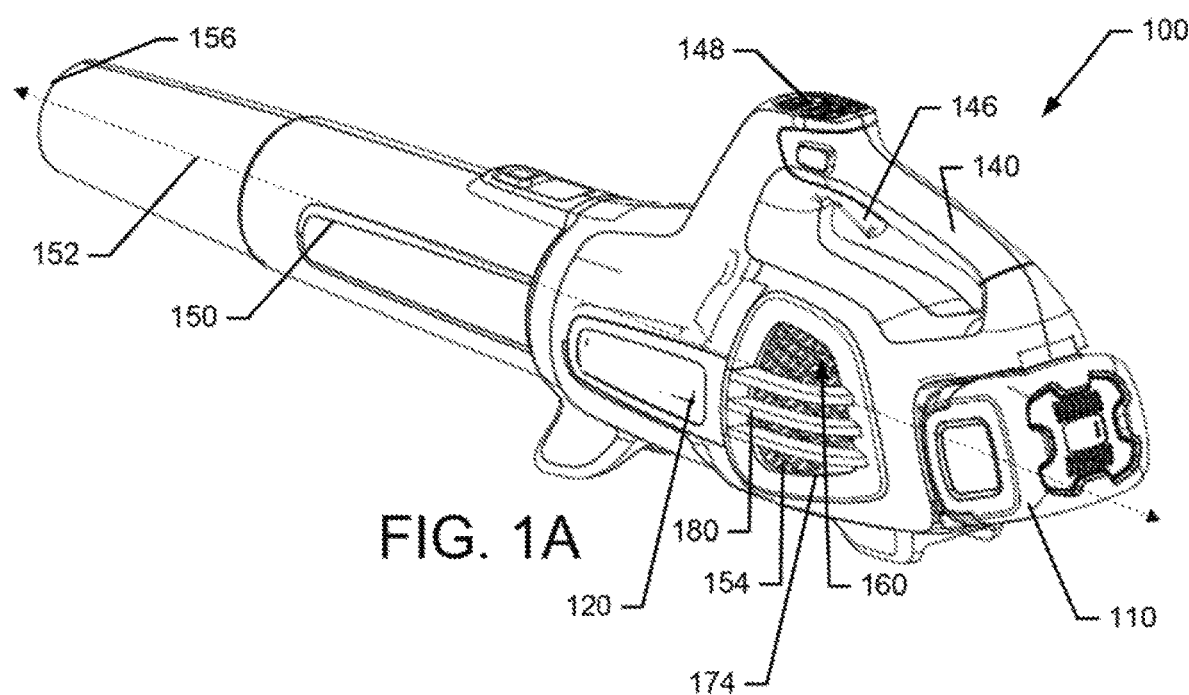
FIG. 1A illustrates a perspective side view of a blower with battery pack installed to show some structures for providing improved capability for reduction of heat within the battery pack in accordance with an example embodiment.
Figure 1B:
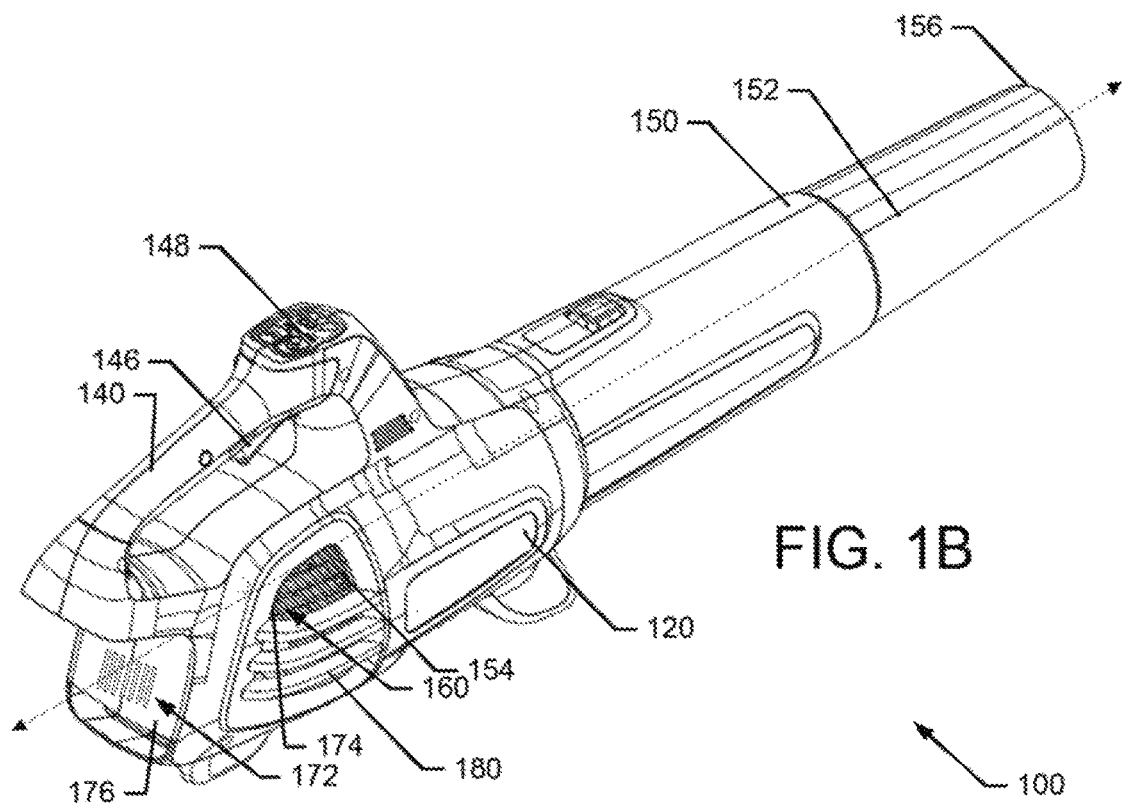
FIG. 1B illustrates a perspective side view of the blower of FIG. 1A with the battery pack removed in accordance with an example embodiment.

FIGS. 1A and 1B illustrate perspective side views of a blower 100 in accordance with an example embodiment. In this regard, FIG. 1A illustrates the blower 100 with a battery pack 110 installed, and FIG. 1B shows the blower 100 without the battery pack 110. The blower 100 may include a housing 120 inside which various components of the blower 100 are housed. For example, the housing 120 may include therein a power unit (e.g., an electric motor) for providing the driving force to move air through the blower 100 via a fan assembly that is powered by the power unit. The power unit may, in turn, receive power from the battery pack 110 when the battery pack 110 is installed in the blower 100. In some embodiments, the power unit may be a three phase electric motor (or DC motor) that is operated under the control of a control unit or control circuitry that may be housed in the housing 120.

The housing 120 may be formed of plastic, composite materials, metals or any other desirable materials. In an example embodiment, the housing 120 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit may be housed in its own portion of the housing 120 above or otherwise proximate to the location of the electric motor and/or fan assembly. The portion of the housing 120 in which the control unit is housed may be referred to as a control unit housing portion, and the control unit housing portion may be an integral part of a half-shell (as described above) or may be a separate housing portion that is joined to other housing portions. The control unit housing portion may be disposed proximate to a portion of the housing 120 near which a handle 140 of the blower 100 is provided (e.g., forward of the handle 140).

In an example embodiment, the handle 140 may include a trigger 146 that may be operated by a finger of the operator while the operator holds the handle 140. Actuation of the trigger 146 may cause power from the battery or other electric power source to be selectively applied to the electric motor to turn the electric motor based on control provided by the control unit. In some cases, the control unit may include interlocks, protective functions or other control mechanisms that may sense various conditions of the blower 100 via sensors, switches or other mechanisms in order to selectively control the application of power to the electric motor based on indications of user intent (e.g., via actuation of the trigger 146) and/or determinations regarding the state of the blower 100 as provided by the sensors, switches or other mechanisms.

Figure 1C:
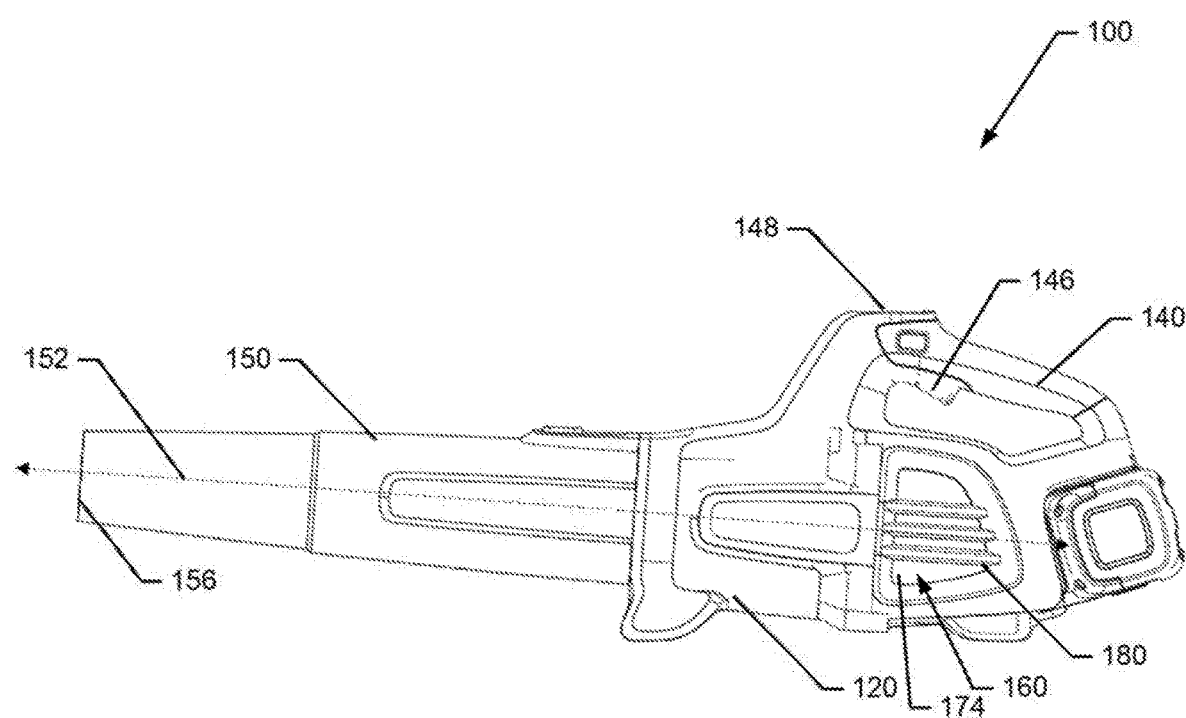
FIG. 1C is a side view of the blower of FIG. 1A in accordance with an example embodiment.

It should be appreciated that although FIG. 1 shows an example in which the trigger 146 is used for selective powering of the motor, other example embodiments may employ a selector, switch, button or other such operative member in order to selectively control operation of the motor. Thus, for example, on/off, speed control or other operable functions for controlling the motor may be performed using an operative member of any desirable form, and the trigger 146 is just one example. Moreover, in some cases, a human machine interface (HMI) 148 may be provided at a portion of the handle 140 (or at another location on the blower 100) to interface with the control unit and provide a user interface via which the user may provide inputs to control various ones of the interlocks, protective functions or other control mechanisms of the blower 100.

The blower 100 may further include a blower tube 150 that is attached to the housing 120 (or is a part of the housing 120) and through which air may be expelled. The blower tube 150 may have a blower tube axis 152, which defines an axial centerline of the blower tube 150. The blower tube 150 may include an inlet portion 154 and an outlet 156. The outlet 156 may be at a distal end of the blower tube 150 and the inlet portion 154 may be located within the housing 120 at an opposite end of the blower tube 150, rearward of the electric motor and substantially below the handle 140. Given that the operator typically holds the blower 100 by the handle 140 and the remainder of the blower 100 is suspended below the handle 140 with the outlet 156 aimed in front of the operator, the handle 140 is generally considered to be at a top portion of the blower 100 and the outlet 156 is at the front, while the inlet portion 154 is considered to be nearer to a rear end of the blower 100. In some cases, the blower tube 150 may taper slightly (i.e., have a decreasing diameter) as the blower tube 150 extends toward the outlet 156. Thus, a largest diameter of the blower tube 150 may be provided at the point of the blower tube 150 that is closest to (and in some cases also surrounding) the electric motor.

In an example embodiment, the inlet portion 154 may draw air from an intake chamber 160 disposed along the blower tube axis 152 rearward of the inlet portion 154. Responsive to operation of the electric motor and the fan assembly, a low pressure area may be created at a rear portion of the fan assembly and in the intake chamber 160 such that air may be drawn into the intake chamber 160 before such air is further drawn through the inlet portion 154 to pass through the blower tube 150 to the outlet 156. Substantially all of the air drawn into the intake chamber 160 may exit the intake chamber 160 via the inlet portion 154 and the blower tube 150. The inlet portion 154 may include an inlet mesh to protect the electric motor and/or fan assembly from debris that may enter into the intake chamber 160.

In an example embodiment, the inlet portion 154 (and/or the inlet mesh) may be circular, oval or any other suitable shape and may be provided at an angle or substantially perpendicular to the blower tube axis 152 so that the inlet portion 154 faces substantially rearward extending slightly into or flush with a forward most portion of the intake chamber 160. The intake chamber 160 may have at least two distinct entrances for air to use to enter the intake chamber 160 when the intake chamber 160 is a low pressure area due to operation of the fan assembly. In this regard, one entrance (e.g., an axial entrance 172) may be substantially aligned with the blower tube axis 152 and another entrance (e.g., a radial entrance 174) may be substantially perpendicular to the blower tube axis 152.

The axial entrance 172 may include a plurality of slots, louvers or other inlet apertures that pass through a rear wall 176 forming the intake chamber 160 to separate the battery pack 110 from the intake chamber 160. The rear wall 176 may lie in a plane that is substantially parallel to a plane in which the inlet portion 154 lies. However, in some cases, the rear wall 176 may be provided at a slight angle offset from parallel (e.g., less than 30 degrees). In any case, the air that enters the intake chamber 160 via the axial entrance 172 may be substantially aligned (e.g., within 30 degrees) with the blower tube axis 152, whereas the air that enters the intake chamber 160 via the radial entrance 174 may be offset from alignment with the blower tube axis 152 by more than 30 degrees (and sometimes by 90 degrees).

In an example embodiment, the radial entrance 174 may include two side apertures (e.g., first and second radial entrance portions) that may be formed in the housing 120 forward of the rear wall 176 and rearward of the inlet portion 154 on opposite (i.e., right and left) sides of the housing 120. The side apertures may include one or more bars or other elongated members 180 that extend across the opening of the side apertures in any desirable orientation or pattern to define boundaries of the intake chamber 160. The size of the openings associated with the axial entrance 172 and the radial entrance 174 may directly impact the amount of air drawn through each respective opening. Thus, for example, by increasing the surface area of the elongated members 180, the size of the radial entrance 174 may effectively be reduced thereby changing the distribution of airflow between the two paths.

Figure 2A:
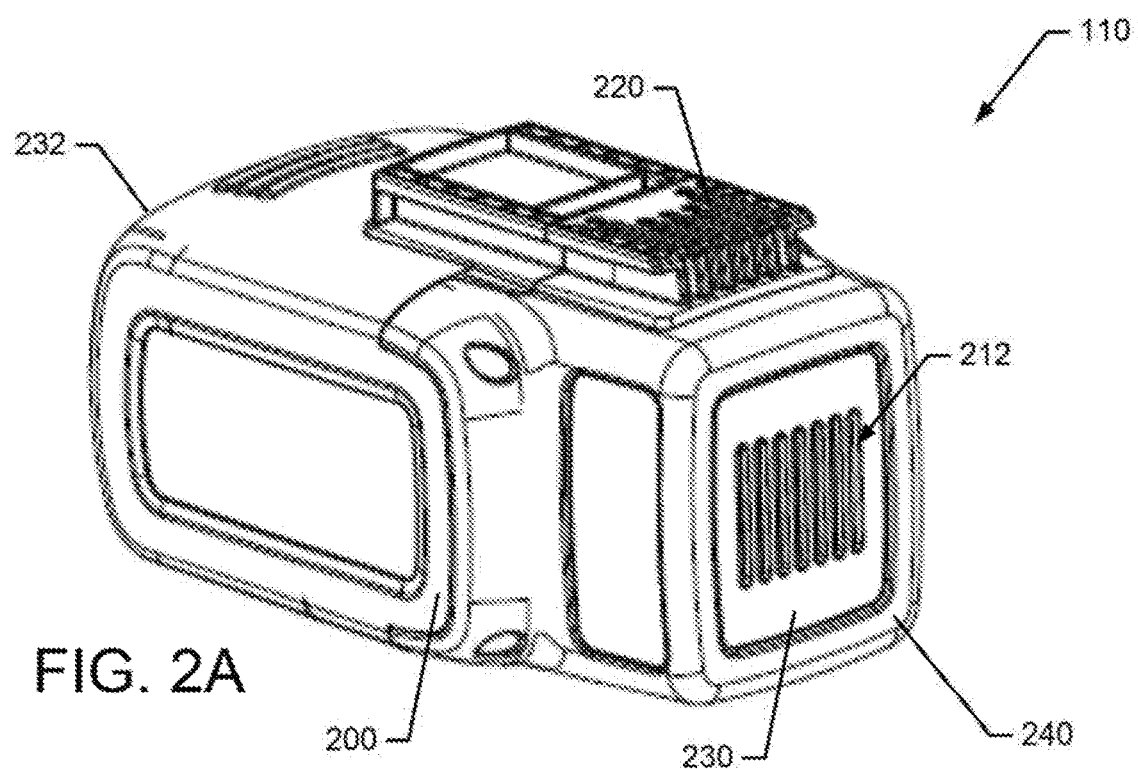
FIG. 2A illustrates a front perspective view of the battery pack in accordance with an example embodiment.
Figure 2B:
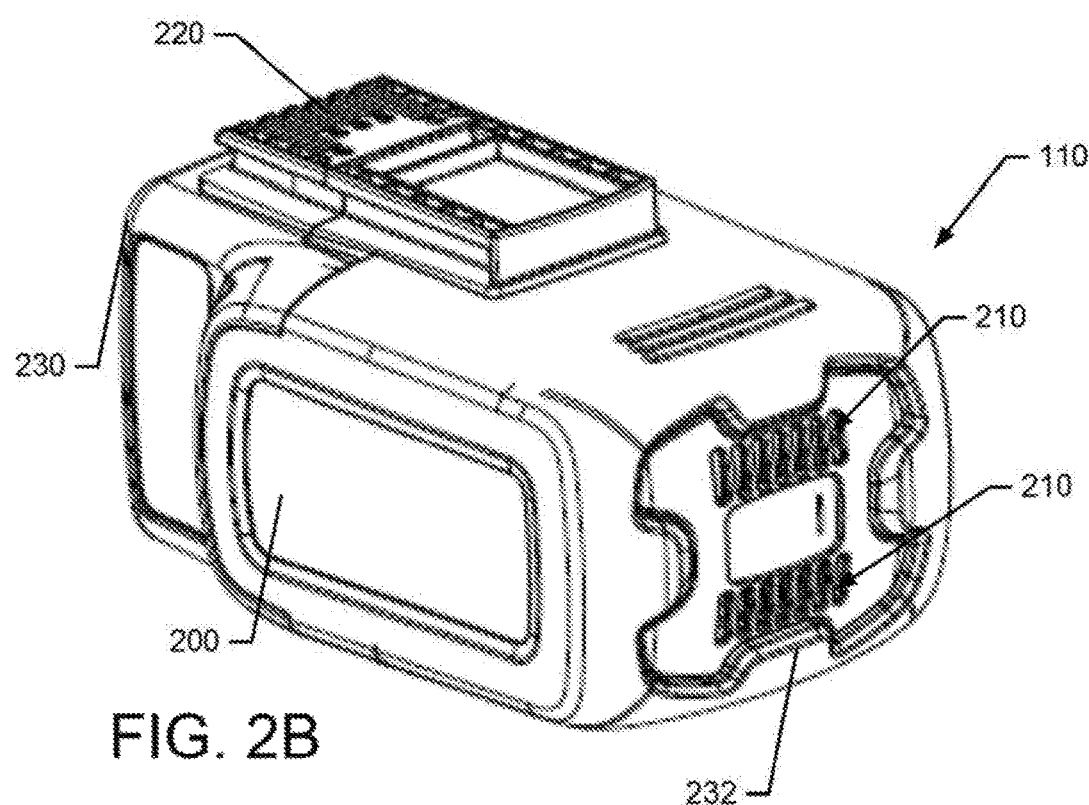
FIG. 2B illustrates a rear perspective view of the battery pack in accordance with an example embodiment.
Figure 2C:
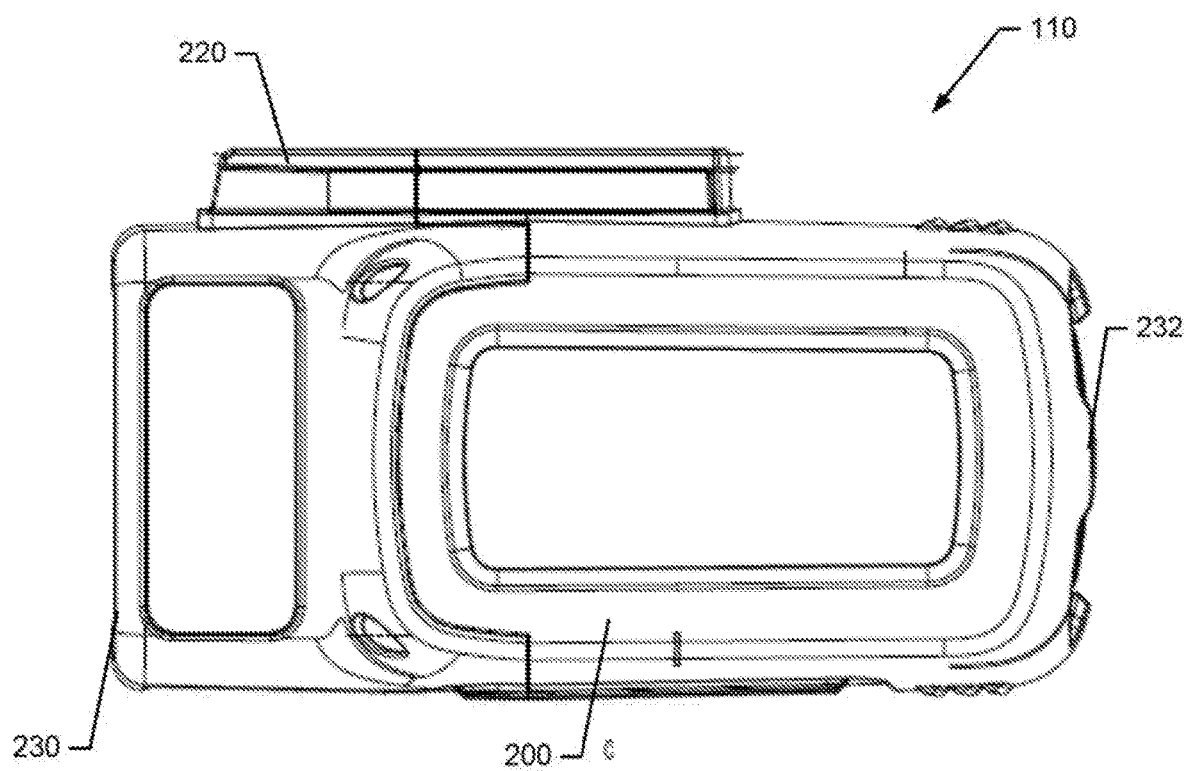
FIG. 2C is a side view of the battery pack in accordance with an example embodiment.

FIG. 2A illustrates a front perspective view of the battery pack 110, and FIG. 2B illustrates a rear perspective view of the battery pack 110 in accordance with an example embodiment. Referring to FIGS. 2A and 2B, it can be appreciated that the battery pack 110 includes a casing 200 that is configured to be substantially air tight except for the inclusion of an air inlet 210 and an air outlet 212, which allow air to enter into and exit from the casing 200, respectively. The battery pack 110 may further include a connection assembly 220 that may include mechanical and electrical connection structures for physically connecting the battery pack 110 to the blower 100, and for electrically connecting the battery cells within the battery pack 110 to the electric motor of the blower 100. The connection assembly 220 of this example happens to be disposed on a top portion (or wall) of the casing 200. However, the connection assembly 220 could alternatively be located at other portions of the casing 200 and, in some cases, electrical and mechanical connections could be physically separated from each other to effectively provide individual or distinct electrical connection and mechanical connection assemblies.

The battery pack 110 includes a front end 230 (or front wall) and a rear end 232 (or rear wall) that are disposed on opposing longitudinal ends of the battery pack 110. As can be appreciated from FIGS. 1B and 2A, when the battery pack 110 is inserted into the blower 100, the front end 230 of the battery pack 110 may lie proximate (and substantially parallel) to the rear wall 176 of the blower 100. Moreover, when the front end 230 and the rear wall 176 lie proximate to each other due to connection of the battery pack 110 to the blower 100, the air outlet 212 from the casing 200 may substantially align with the axial entrance 172 formed in the rear wall 176 so that air can pass from the casing 200 directly into the intake chamber 160 due to the low pressure area created in the intake chamber 160.

As shown in FIGS. 2A and 2B, the air inlet 210 and the air outlet 212 may each be defined by a corresponding array of louvers, slots or other apertures through which air can pass. The apertures may be arranged to extend substantially parallel to each other in some cases to enable compact placement of the apertures. Moreover, in some cases, the apertures may be arranged to extend substantially perpendicular to planes in which top and bottom walls of the casing 200 lie. The apertures may be provided adjacent to each other to define a single array (as in the example of the air outlet 212), or may be split into groups to define multiple arrays (as in the example of the air inlet 210).

In some cases, it may be desirable to maintain an airtight seal between the rear wall 176 of the blower 100 and the front end 230 of the battery pack 110. To achieve such a seal, a sealing surface 240 may be defined at one or both of the rear wall 176 and the front end 230. In the example of FIG. 2A, the sealing surface 240 may take a rectangular shape in the form of a rubber over-mold disposed around a raised portion of the front end 230. The sealing surface 240 may define or correspond to a perimeter of the front end 230. The raised nature of the sealing surface 240 may create a space (e.g., a chamber) between the front end 230 and the rear wall 176 making exact alignment of apertures in the air outlet 212 with corresponding apertures of the axial entrance 174 unnecessary. Accordingly, air may be pulled into the casing 200 through the air inlet 210 at the rear end 232 of the battery pack 110 and pass through the casing 200 to the front end 230 in order to exit the casing 200 and pass into the intake chamber 160 via the air outlet 212 and the axial entrance 172. Thus, for example, air that is expelled through the blower tube 150 may include air that has been drawn through the battery pack 110 to cool cells therein. In some cases, the battery pack 110 may therefore be structured to further enhance the impact and positive effects of the cooling that can be achieved in this way.

Figure 3A:
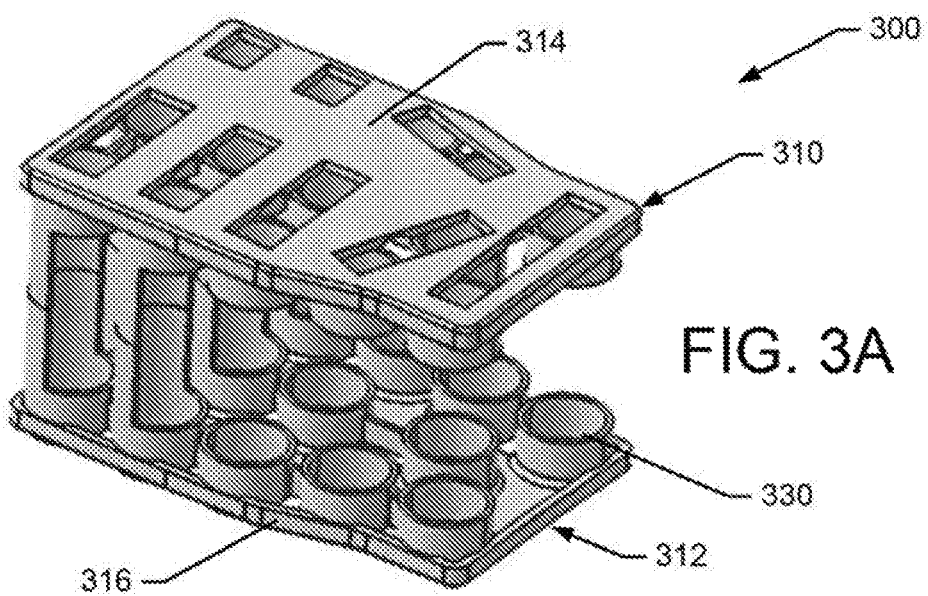
FIG. 3A illustrates a front perspective view of a cell carriage assembly in accordance with an example embodiment.
Figure 3B:
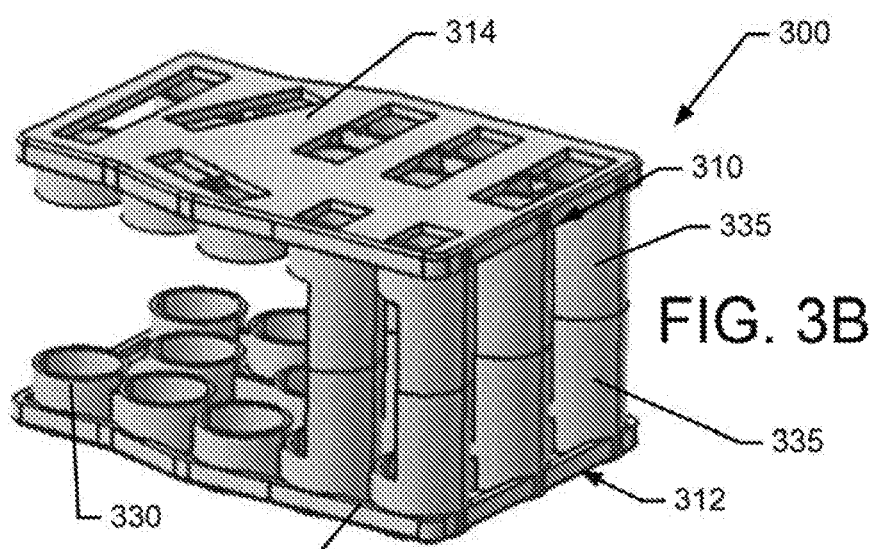
FIG. 3B illustrates a rear perspective view of the cell carriage assembly in accordance with an example embodiment.
Figure 3C:
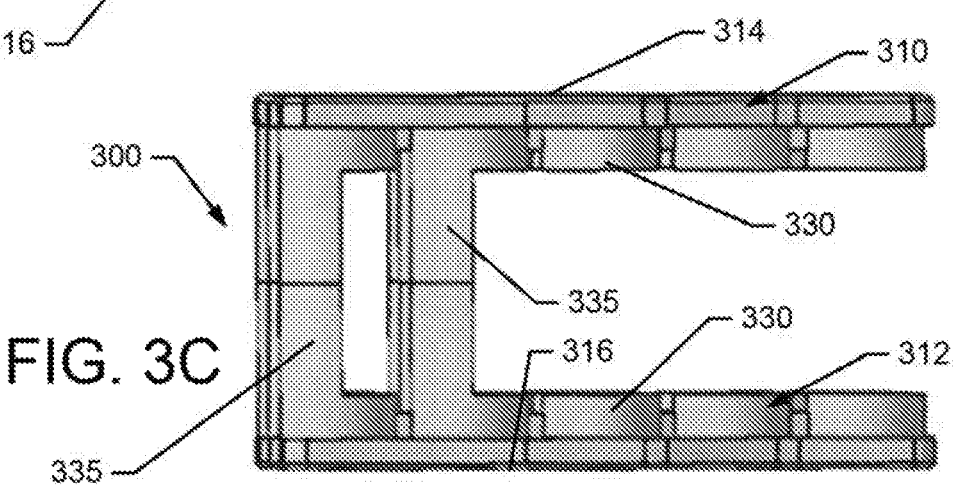
FIG. 3C illustrates a side view of the cell carriage assembly in accordance with an example embodiment.

FIGS. 3A, 3B, 3C, 4, 5A and 5B illustrate details regarding how internal structures of the battery pack 110 may be employed to enhance the cooling capacity of the air drawn in the air inlet 210 and expelled from the air outlet 212 before being drawn into the intake chamber 160 and ultimately being propelled through the blower tube 150. In this regard, FIG. 3A illustrates a front perspective view of a cell carriage assembly 300 and FIG. 3B illustrates a rear perspective view of the cell carriage assembly 300. FIG. 3C illustrates a side view of the cell carriage assembly 300. As shown in FIGS. 3A, 3B and 3C, the cell carriage assembly 300 may include a first portion 310 (e.g., a top portion) and a second portion 312 (e.g., a bottom portion). The first and second portions 310 and 312 may substantially mirror each other about a plane that may divide the cell carriage assembly 300 in half between top and bottom portions. However, in some embodiments, a third portion may be provided to connect the top and bottom portions. Thus, for example, the first and second portions 310 and 312 may be joined together by the third portion, which may clip on or otherwise be joined to each of the first and second portions 310 and 312.

Figure 4:
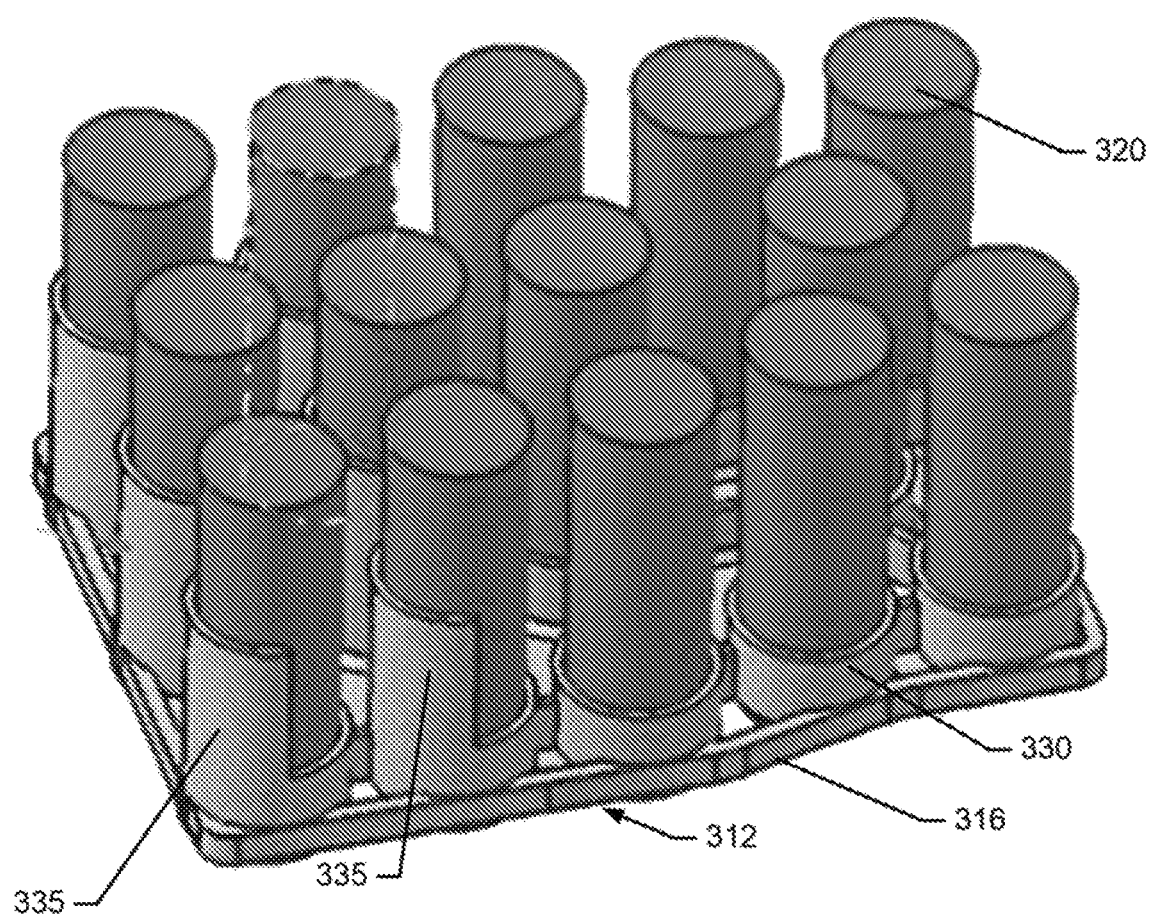
FIG. 4 illustrates a perspective view of a portion of the cell carriage assembly with battery cells disposed within cell sockets in accordance with an example embodiment.

FIG. 4 illustrates a perspective view of the second portion 312 of the cell carriage assembly 300 with battery cells 320 disposed within cell sockets 330 disposed in the second portion 312. The cell sockets 330 may be defined as cylindrical tubes that receive end portions of the battery cells 320 and extend away from top and bottom plates 314 and 316 of the first and second portions 310 and 312, respectively. In an example embodiment, each of the cell sockets 330 may extend up the peripheral edges of the battery cells 320 to cover less than 10% or 15% of the longitudinal length of the battery cells 320. Thus, for example, 70% (or more) of the surface area of the peripheral edges of the battery cells 320 may be exposed for most of the battery cells 320. However, as will be discussed in greater detail below, some battery cells 320 may have less surface area exposure.

The top and bottom plates 314 and 316 may include cutout portions that are used to make electrical connections between selected ones of the battery cells 320. In some cases, a circuit board or other electronic circuitry associated with defining a battery management system (BMS) may be integrated into or otherwise operably coupled to one of the top and bottom plates 314 and 316. The airflow through the casing 200 may also cool the BMS in some cases.

Figure 5A:
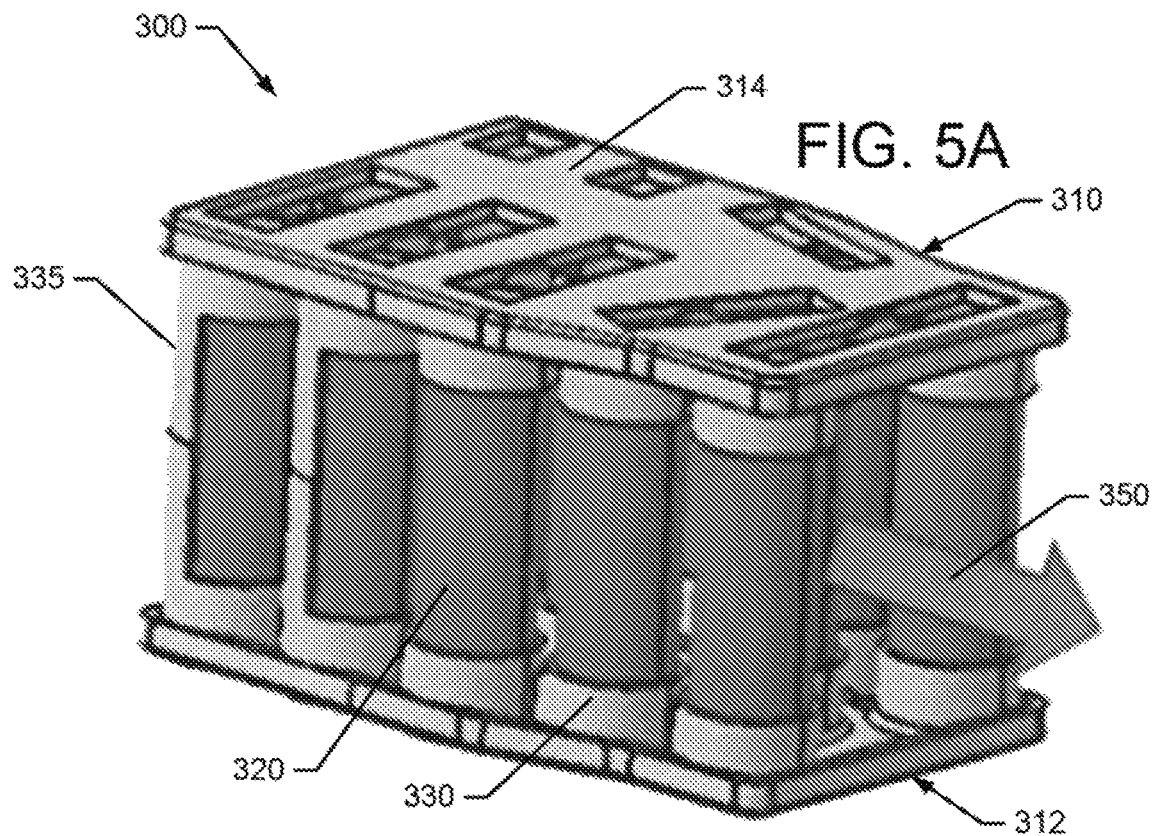
FIG. 5A illustrates a front perspective view of the cell carriage assembly with battery cells disposed therein in accordance with an example embodiment.
Figure 5B:
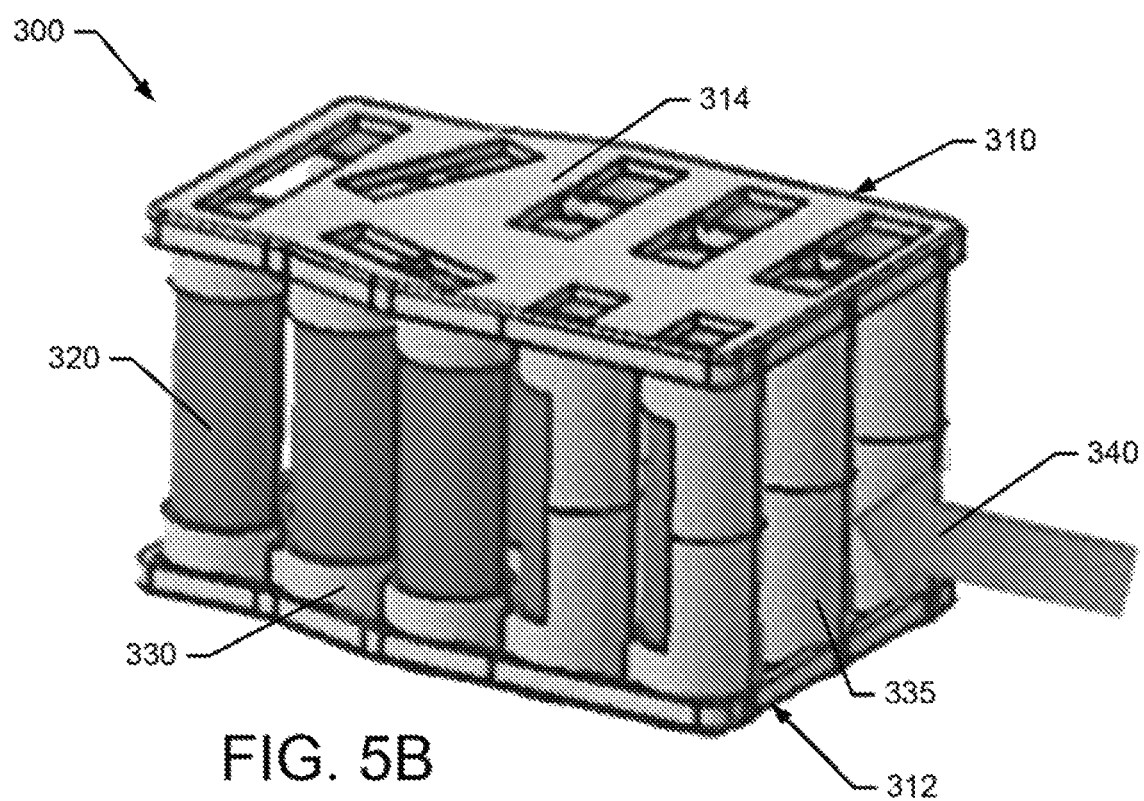
FIG. 5B illustrates a rear perspective view of the cell carriage assembly with battery cells disposed therein according to an example embodiment.

FIG. 5A illustrates a front perspective view of the cell carriage assembly 300 with battery cells 320 disposed therein and FIG. 5B illustrates a rear perspective view of the cell carriage assembly 300 with battery cells 320 disposed therein according to an example embodiment. As shown in FIGS. 3A, 3B, 3C, 4, 5A and 5B, each of the first portion 310 and the second portion 312 includes shield sections 335 that correspond to only selected ones of the cell sockets 330. In this regard, the shield sections 335 extend away from the cell sockets 330 on only one side of the cell sockets 330 (e.g., a rear facing side) until the shield sections 335 meet each other. In the example embodiment shown, the shield sections 335 are provided only on cell sockets 330 that are in the two rows closest to the rear end of the cell carriage assembly 300. However, shield sections 335 could alternatively be only on the row closest to the rear end of the cell carriage assembly 300 or on more rows than just two. Additionally, although the shield sections 335 cover about half of the surface area of the periphery of the battery cells 320, the shield sections 335 could cover any desirable fraction of the surface area of the periphery of the battery cells 320 in alternative embodiments. Moreover, in some cases, the fraction of surface area of the periphery of the battery cells 320 that is covered by the shield sections 335 may decrease for each row as distance from the air inlet 210 increases. In this example, the shield sections 335 and the cell sockets 330 will cover more than 50% of the surface area of the periphery of the battery cells 320 that have shield sections 335. Meanwhile, greater than 70% (and perhaps greater than 80%) of the surface area of the periphery of the battery cells 320 that do not have shield sections may be uncovered. However, other strategies for partially blocking air from direct contact with portions of the battery cells 320 nearest the air inlet 210 that face the incoming air may alternatively be employed. For example, a hemisphere or leading half of the cell periphery facing the airflow may be shielded, or larger or smaller portions thereof may be shielded in various example embodiments.

FIG. 5B illustrates how air entering into the vicinity of the battery cells 320 as represented by arrow 340 can pass between and around the battery cells 320 other than portions of the battery cells 320 that are covered by the shield sections 335. FIG. 5A shows how air exits the vicinity of the battery cells 320 as indicated by arrow 350. As can be appreciated from FIGS. 5A and 5B, the air represented by arrow 340 is generally cool and begins to carry heat away from the battery cells 320 as it passes by the battery cells 320. The air represented by arrow 350 carries heat removed from the battery cells 320 and is therefore hotter than the air represented by arrow 340. As the air heats up, its capacity to remove heat from other battery cells 320 may be reduced. Accordingly, if the air is heated quickly nearest the air inlet 210, the capacity of the air for removal of heat from battery cells 320 nearer the air outlet 212 may be reduced, thereby resulting in hotter battery cells 320 nearer the air outlet 212. To avoid this, the shield sections 335 may reduce the contact between the air and battery cells 320 near the air inlet 210. Although the air has less exposure to the battery cells 320 near the air inlet 210, these battery cells 320 are still effectively cooled due to the cooler nature of the air in this area. However, the air retains more heat carrying capacity deeper into the length of the battery pack 110 so that the air has a higher heat carrying capacity when the battery cells 320 nearer the air outlet 212 are encountered.

Accordingly, the shield sections 335 allow for a more even removal of heat from the battery cells 320 even though the shield sections 335 clearly inhibit heat removal from some battery cells 320. However, it should also be appreciated that the battery cells 320 may be more densely packed near the shield sections 335 and less densely packed proximate to the air outlet 212. In this regard, the battery pack 110 is narrower at the end thereof at which the air outlet 212 is formed than at the end thereof at which the air inlet 210 is formed. The decreased density of cells near the air outlet 212 may also facilitate a more even heat removal from the battery cells 320 as the air passes along exposed side surfaces of the battery cells 320.

Figure 5C:
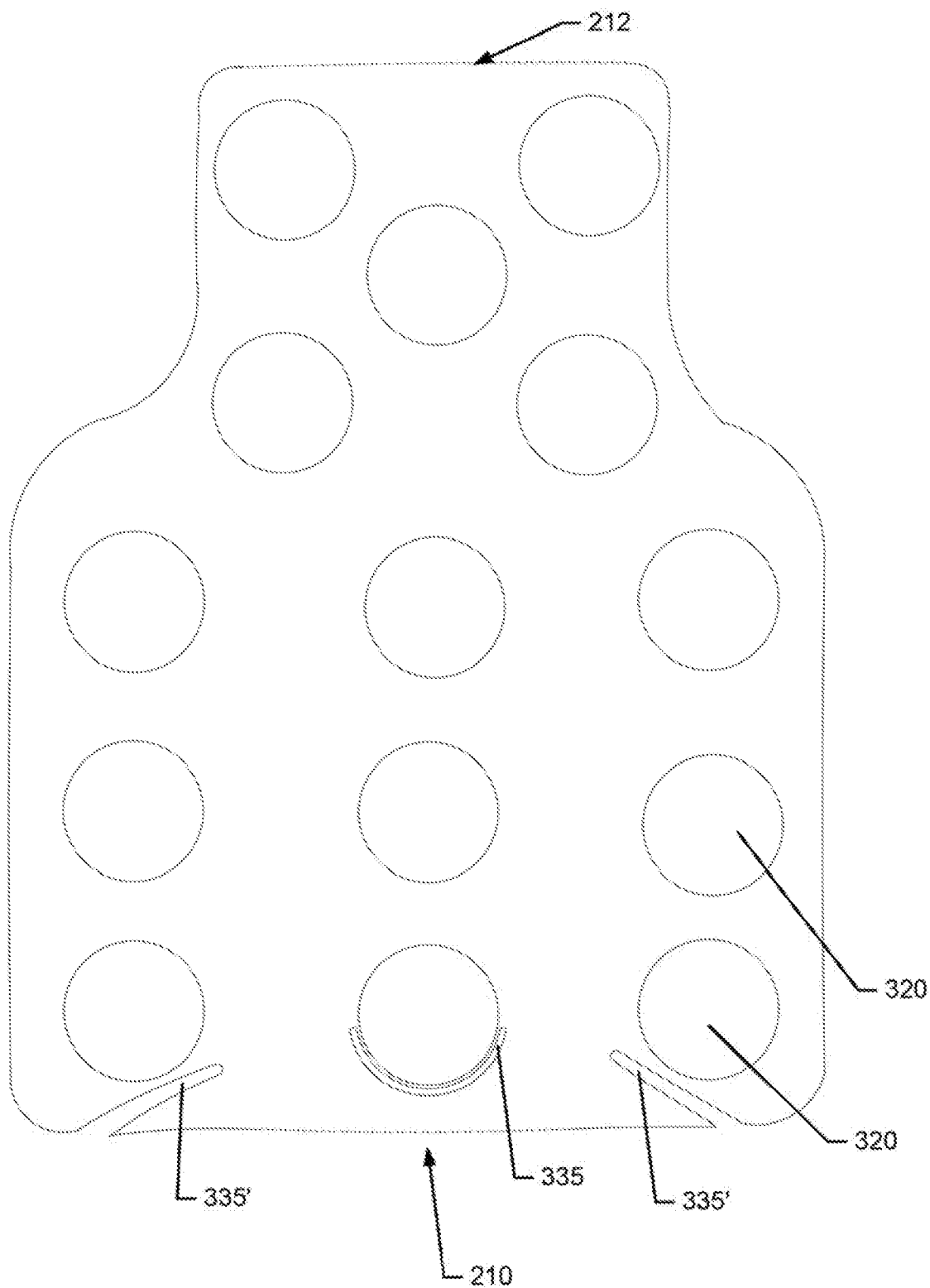
FIG. 5C illustrates a top view of an alternative design for shield sections that can be employed with a cell carriage assembly of an example embodiment.

The shield sections 335 of FIGS. 5A and 5B are generally shown to wrap around the battery cells 320 in contact (or nearly in contact) with the battery cells 320 to partially block cooling air from contact with the peripheral edges of the battery cells 320 nearest the air inlet 210. However, the shield sections 335 could also take other forms or shapes that accomplish substantially the same function with slightly different structures. For example, FIG. 5C illustrates a set of shield sections 335' that are embodied as ribs that direct flow away from peripheral edges of some of the battery cells 320. These rib-like shield sections 335' can be used instead of or in combination with the shield sections 335 of FIGS. 5A and 5B, and can be provided as single pieces that attach to the first and second portions 310 and 312, or may be parts of the first and second portions 310 and 312. In either case, shield sections 335 may be configured to divert air away from the exposed surface (i.e., peripheral edges) of the battery cells 320 that are to be shielded. The shield sections 335' may extend at least as long as the distance between the cell sockets 330 or the length of the battery cells 320. Thus, for example, the shield sections 335' may effectively extend from the top of the casing 200 to the bottom of the casing 200 in a continuous manner to divert air away from the battery cells 320 to which the shield sections 335' are proximate.

FIG. 6A illustrates a partial cutaway view of a portion of the blower tube 150 in which an electric motor 500 and fan assembly 510 driven thereby may be positioned in accordance with an example embodiment. FIGS. 6B and 6C illustrate different perspectives of cross sectional views of the blower 100. The view of FIG. 6A is taken in cross section looking from above the blower 100. FIG. 6B illustrates a side view of the blower 100 in cross section and FIG. 6C illustrates a rear left perspective view of the blower 100 in cross section. In FIG. 6A, the intake chamber 160 is represented by a dashed line to allow arrow 520 to represent air drawn in through the radial entrances 174 and arrow 530 to represent air drawn into the intake chamber 160 from the axial entrance 172. In an example embodiment, about 600 to 650 cfm of air may be drawn into the blower tube 150 by the operation of the fan assembly 510. Of that air, less than 10%, and in some cases less than 5% may be attributable to the axial entrance 172 (e.g., about 25 cubic feet per minute (cfm)), and remaining air may be drawn in through the radial entrances 174. In order to draw more air through the axial entrance 172 to increase the cooling capacity for cooling battery cells 320 without requiring any other fans or cooling equipment, sizes of the openings associated with the radial entrances 174 may be reduced to increase the vacuum drawn (i.e., decrease pressure in the intake chamber 160) and air passed through the battery pack 110. As shown in FIGS. 6B and 6C, cooling air is drawn in through the battery pack 110 via the air inlet 210 and then through the axial entrances 172 to the intake chamber 160. The cooling air is integrated with other air drawn in through the radial entrances 174 in the intake chamber 160 before being drawn into the blower tube 150 by the fan assembly 510. The air then passes by the electric motor 500 as it passes down the blower tube 150 out of the blower 100 to be expelled. In some cases, a control unit 590 or other control electronics for control of the electric motor 500, the fan assembly 510, the HMI 148 and/or the like responsive to operation of the trigger 146 may be provided within a portion of the housing 120 that allows the control unit 590 to also be at least partially cooled by air that passes through the blower 100, trigger assembly, and other housing internals The battery pack 110 may be used in outdoor power equipment, including blowers, having various different structures. For example, FIGS. 7A and 7B illustrate an alternative structure for a blower 500 in which the blower 500 takes the form of a backpack blower. As shown in FIGS. 7A and 7B, the blower 500 includes a back harness 510 into which the battery pack 110 can be inserted. The battery pack 110 powers the blower 500 and allows cooling air to be drawn through the battery pack 110 prior to being incorporated into the air that is ultimately discharged from the blower tube 550 as described above. In this regard, the blower 500 includes an intake chamber 560 that incorporates the cooling air drawn in through the battery pack 110 along with other air drawn into the intake chamber 560 from a radial entrance 562 that is substantially at a 90 degree angle to an axis of the blower tube 550. Thus, air drawn into the intake chamber 560 from the battery pack 110 is drawn in along a path that lies in a plane substantially parallel to the direction of extension of the blower tube 550 (and the axis of the blower tube 550). However, the radial entrance 562 is substantially perpendicular to the direction of extension of the blower tube 550 (and the axis of the blower tube 550).

A blower of an example embodiment may therefore include a housing having a handle, an electric motor powered by a battery pack, and a fan assembly operably coupled to the electric motor to force air through a blower tube responsive to operation of the electric motor. The blower tube defines a blower tube axis. The fan assembly creates a low pressure area in a intake chamber that provides the air to the fan assembly. The air enters the intake chamber via at least one radial entrance and an axial entrance disposed in the housing. The axial entrance is configured to receive cooling air that has passed through the battery pack.

The blower of some embodiments may include additional features that may be optionally added either alone or in combination with each other. For example, in some embodiments, (1) the intake chamber may be defined at least in part by a rear wall that substantially faces an inlet portion of the blower tube. The axial entrance may be defined by one or more apertures formed in the rear wall. In some cases, (2) the battery pack may include an air outlet disposed at a front end of a casing of the battery pack. The air outlet may face the one or more apertures of the axial entrance responsive to mating the battery pack with the housing. In an example embodiment, (3) the rear wall of the housing or the front end of the casing may include a sealing surface to provide a substantially air tight seal between the housing and the casing of the battery pack. In some examples, (4) the at least one radial entrance may include two apertures disposed on opposite sides of the housing. In some embodiments, (5) the sealing surface may include a rubber over-mold disposed on a raised surface on the front end of the casing. In some cases, (6) the cooling air may pass through the battery pack at an angle within 20 degrees of alignment with the blower tube axis. In some examples, (7) an air inlet into the casing may be disposed at a rear end of the battery pack. In an example embodiment, (8) the rear end of the battery pack may be wider than the front end of the battery pack. In some cases. (9) the casing may house a cell carriage assembly configured to retain battery cells of the battery pack. In some embodiments, (10) the cell carriage assembly may include a first portion and a second portion, and each of the first and second portions may define cell sockets configured to receive individual ones of the battery cells. In an example embodiment, (11) the cell sockets may be closer together proximate to the rear end of the battery pack than the front end. In some cases, (12) the cell carriage assembly may include one or more shield sections extending between cell sockets around at least a portion of peripheral side edges of corresponding ones of the battery cells. In some examples, (13) greater than 50% of peripheral side edges of battery cells associated with the one or more shield sections may be covered by the cell sockets and the one or more shield sections, and greater than 70% of peripheral side edges of battery cells not associated with the one or more shield sections may not be covered. In some embodiments, any or all of (1) to (13) may be employed in addition to the cooling air comprising less than 5% of the air passed through the blower.

In another example embodiment, a battery pack for powering an electric motor of a blower is provided. The electric motor may power a fan assembly operably coupled to the electric motor to force air through a blower tube responsive to operation of the electric motor. The battery pack may include a casing and battery cells cooled by cooling air drawn through the casing and configured to be expelled into an intake chamber that provides the air to the fan assembly. The casing is configured to mate with the housing such that, when mated, at least a portion of the air that is ultimately forced through the blower tube includes the cooling air that was used to cool the battery cells in the casing, and that cooling air enters the intake chamber via an axial entrance disposed in the housing.

The battery pack of some embodiments may include additional features that may be optionally added either alone or in combination with each other. For example, in some embodiments, (1) the battery pack may include an air outlet disposed at a front end of the casing, and an air inlet disposed at a rear end of the casing. The air outlet may face one or more apertures of the axial entrance responsive to mating the casing with the housing. In some cases, (2) the front end of the casing may include a sealing surface to provide a substantially air tight seal between the housing and the casing of the battery pack. In an example embodiment, (3) the sealing surface may include a rubber over-mold disposed on a raised surface on the front end of the casing. In some examples, (4) the rear end of the battery pack may be wider than the front end of the battery pack.

In some embodiments, any or all of (1) to (4) may be employed in addition to the optional modifications or augmentations described below. For example, in some embodiments, the casing houses a cell carriage assembly that may be configured to retain the battery cells of the battery pack. Alternatively or additionally, the cell carriage assembly may include a first portion and a second portion, each of the first and second portions defining cell sockets configured to receive individual ones of the battery cells. Additionally or alternatively, the cell sockets may be closer together proximate to the rear end of the battery pack than the front end. Additionally or alternatively, the cell carriage assembly may include one or more shield sections extending between cell sockets around at least a portion of peripheral side edges of corresponding ones of the battery cells. Additionally or alternatively, greater than 50% of peripheral side edges of battery cells associated with the one or more shield sections may be covered by the cell sockets and the one or more shield sections, while greater than 70% of peripheral side edges of battery cells not associated with the one or more shield sections are not covered.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
a housing comprising a handle;
an electric motor powered by a battery pack; and
a fan assembly operably coupled to the electric motor to force air through a blower tube responsive to operation of the electric motor, the blower tube defining a blower tube axis,
wherein the fan assembly creates a low pressure area in an intake chamber that provides the air to the fan assembly,
wherein the air enters the intake chamber via at least one radial entrance and an axial entrance disposed in the housing,
wherein the axial entrance is configured to receive cooling air that has passed through the battery pack,
wherein the intake chamber is defined at least in part by a rear wall that substantially faces an inlet portion of the blower tube, and wherein the axial entrance is defined by one or more apertures formed in the rear wall, and
wherein the battery pack comprises an air outlet disposed at a front end of a casing of the battery pack, and wherein the air outlet faces the one or more apertures of the axial entrance responsive to mating the battery pack with the housing, and the rear wall of the housing or the front end of the casing comprises a sealing surface to provide a substantially air tight seal between the housing and the casing of the battery pack.

2. The blower of claim 1, wherein the at least one radial entrance comprises first and second radial aperture portions disposed on opposite sides of the housing.

3. The blower of claim 1, wherein the sealing surface comprises a rubber over-mold disposed on a raised surface on the front end of the casing.

4. The blower of claim 1, wherein the cooling air passes through the battery pack at an angle within 20 degrees of alignment with the blower tube axis.

5. The blower of claim 1, wherein an air inlet into the casing is disposed at a rear end of the battery pack.

6. The blower of claim 5, wherein the rear end of the battery pack is wider than the front end of the battery pack.

7. The blower of claim 5, wherein the casing houses a cell carriage assembly configured to retain battery cells of the battery pack.

8. The blower of claim 7, wherein the cell carriage assembly comprises a first portion and a second portion, each of the first and second portions defining cell sockets configured to receive individual ones of the battery cells.

9. The blower of claim 8, wherein the cell sockets are closer together proximate to the rear end of the battery pack than the front end.

10. The blower of claim 7, wherein the cell carriage assembly comprises one or more shield sections extending between cell sockets around at least a portion of peripheral side edges of corresponding ones of the battery cells.

11. The blower of claim 10, wherein greater than 50% of peripheral side edges of battery cells associated with the one or more shield sections are covered by the cell sockets and the one or more shield sections, and wherein greater than 70% of peripheral side edges of battery cells not associated with the one or more shield sections are not covered.

12. The blower of claim 1, wherein the cooling air comprises less than 5% of the air passed through the blower.

13. A blower comprising:

a housing comprising a handle;

an electric motor powered by a battery pack; and a fan assembly operably coupled to the electric motor to force air through a blower tube responsive to operation of the electric motor, the blower tube defining a blower tube axis, wherein the fan assembly creates a low pressure area in an intake chamber that provides the air to the fan assembly, wherein the air enters the intake chamber via at least one radial entrance and an axial entrance disposed in the housing, wherein the axial entrance is configured to receive cooling air that has passed through the battery pack, wherein the intake chamber is defined at least in part by a rear wall that substantially faces an inlet portion of the blower tube, and wherein the axial entrance is defined by one or more apertures formed in the rear wall, and wherein the battery pack comprises an air outlet disposed at a front end of a casing of the battery pack, and wherein the air outlet faces the one or more apertures of the axial entrance responsive to mating the battery pack with the housing, and the cooling air passes through the battery pack at an angle within 20 degrees of alignment with the blower tube axis.

\* \* \* \* \*